(12) United States Patent
Schmalenberg et al.

(10) Patent No.: US 11,780,349 B2
(45) Date of Patent: Oct. 10, 2023

(54) SYSTEM AND METHOD FOR DETECTING OBJECTS LEFT BEHIND BY USING HEATED RESISTIVE FILAMENT IN A VEHICLE

(71) Applicant: TOYOTA MOTOR ENGINEERING & MANUFACTURING NORTH AMERICA, INC., Plano, TX (US)

(72) Inventors: Paul D. Schmalenberg, Ann Arbor, MI (US); Ercan Mehmet Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 183 days.

(21) Appl. No.: 17/197,600

(22) Filed: Mar. 10, 2021

(65) Prior Publication Data

US 2022/0289075 A1 Sep. 15, 2022

(51) Int. Cl.
*B60N 2/00* (2006.01)
*B60N 2/56* (2006.01)
*G01V 9/00* (2006.01)
*B60H 1/00* (2006.01)
*G06V 10/75* (2022.01)
*G06V 20/59* (2022.01)

(52) U.S. Cl.
CPC ......... *B60N 2/002* (2013.01); *B60H 1/00742* (2013.01); *B60N 2/5685* (2013.01); *G01V 9/005* (2013.01); *G06V 10/751* (2022.01); *G06V 20/59* (2022.01)

(58) Field of Classification Search
CPC ........ B60N 2/002; B60N 2/5685; B60N 2/56; B60N 2/58; B60N 3/04; B60H 1/00742; G01V 9/005; G06V 10/751; G06V 10/143; G06V 20/59; G06V 20/593; B06H 2001/2228; B06H 2001/224
See application file for complete search history.

(56) References Cited

U.S. PATENT DOCUMENTS 9,381,855 B1 * 7/2016 Arnold .................... G08B 21/22
9,809,085 B1 * 11/2017 Pierce ................ B60H 1/00985
(Continued)

FOREIGN PATENT DOCUMENTS

CN 102233858 B * 1/2016 ......... B60H 1/00742
CN 109050395 A * 12/2018 ............. B60N 2/002
(Continued)

*Primary Examiner* — John Villecco
*Assistant Examiner* — Kathleen M Broughton
(74) *Attorney, Agent, or Firm* — Oblon, McClelland, Maier & Neustadt, L.L.P.

(57) ABSTRACT

A system and a method for determining an object has been on a vehicle seat of a vehicle are provided. The processing circuitry may determine if passengers of the vehicle have left the vehicle. The processing circuitry may determine if a temperature of a vehicle cabin of the vehicle meets a threshold of temperature. The temperature of the vehicle cabin to a first temperature may be adjusted. A temperature of resistive filaments of the vehicle seat of the vehicle to a second temperature may be adjusted. A thermal image of the vehicle seat with a reference thermal image of the vehicle seat may be compared. The processing circuitry may determine if the object has been left on the vehicle seat.

20 Claims, 6 Drawing Sheets

(56) References Cited

U.S. PATENT DOCUMENTS

| | | | |
|---|---|---|---|
| 9,909,349 B2 | 3/2018 | Bradley et al. | |
| 10,290,158 B2 | 5/2019 | Jales Costa et al. | |
| 2017/0046937 A1* | 2/2017 | Chacon, Jr. ............ | G08B 21/18 |
| 2017/0330044 A1 | 11/2017 | Telpaz et al. | |
| 2020/0156435 A1* | 5/2020 | Patil .................. | B60H 1/00742 |

FOREIGN PATENT DOCUMENTS

| | | | | |
|---|---|---|---|---|
| CN | 109674390 A | * | 4/2019 | ........... A47K 13/305 |
| CN | 110549976 A | * | 12/2019 | |
| WO | WO 2015/025435 A1 | | 2/2015 | |
| WO | WO 2019/185359 A1 | | 10/2019 | |

* cited by examiner

SYSTEM AND METHOD FOR DETECTING OBJECTS LEFT BEHIND BY USING HEATED RESISTIVE FILAMENT IN A VEHICLE

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

U.S. Pat. No. 9,909,349B2 to Bradley et al. describes a system for monitoring a vehicle used in providing a service. In particular, the invention includes the system determines, from one or more sensors of the vehicle, that an object which should have been removed from the vehicle after completion of the transport service, remains in the vehicle.

SUMMARY

In an exemplary aspect, a method of determining an object has been on a vehicle seat of a vehicle is presented. The method includes determining, by processing circuitry, if passengers of the vehicle have left the vehicle, the passengers of the vehicle having left the vehicle being detected by a first set of sensors. The method includes determining, by the processing circuitry, if a temperature of a vehicle cabin of the vehicle meets a threshold of temperature, the temperature of the vehicle cabin being detected by a second set of sensors. The method includes adjusting the temperature of the vehicle cabin to a first temperature. The method includes adjusting a temperature of resistive filaments of the vehicle seat of the vehicle to a second temperature. The method includes comparing a thermal image of the vehicle seat with a reference thermal image of the vehicle seat. The method further includes determining, by the comparison, if the object has been left on the vehicle seat.

In an exemplary aspect, a system for determining an object has been on a vehicle seat of a vehicle is presented. The processing circuitry is configured to determine if passengers of the vehicle have left the vehicle, the passengers of the vehicle having left the vehicle being detected by a first set of sensors. The processing circuitry is configured to determine if a temperature of a vehicle cabin of the vehicle meets a threshold of temperature, the temperature of the vehicle cabin being detected by a second set of sensors. The temperature of the vehicle cabin to a first temperature is adjusted. A temperature of resistive filaments of the vehicle seat of the vehicle to a second temperature is adjusted. A thermal image of the vehicle seat with a reference thermal image of the vehicle seat are compared. By the comparison, the processing circuitry determines if the object has been left on the vehicle seat.

In an exemplary aspect, the passengers of the vehicle having left the vehicle may be determined after the vehicle stops operating.

In an exemplary aspect, the first set of sensors may include at least one of cameras, weight sensors, and motion sensors.

In an exemplary aspect, the second set of sensors may include at least one of infrared sensors and temperature sensors.

In an exemplary aspect, the threshold of the temperature may be between 10 degrees Celsius and 30 degrees Celsius.

In an exemplary aspect, the thermal image is captured by the second set of sensors.

In an exemplary aspect, the determination if the object has been left on the vehicle seat is transmitted to at least one of a database in the vehicle, a database in a vehicle manufacturer, and a database in a vehicle service center.

In an exemplary aspect, the reference thermal image is dependent on the first temperature and the second temperature.

In an exemplary aspect, the determination that the object has been left on the vehicle seat is based on a difference of the thermal image and the reference thermal image.

In an exemplary aspect, the resistive filaments are further integrated with luminescent dyes, thermal activated dyes, or infrared paint.

In another exemplary aspect, a non-transitory computer readable storage medium having instructions stored thereon that when executed by processing circuitry causes the processing circuitry to perform a method which includes determining, by processing circuitry, if passengers of the vehicle have left the vehicle, the passengers of the vehicle having left the vehicle being detected by a first set of sensors. The method includes determining, by the processing circuitry, if a temperature of a vehicle cabin of the vehicle meets a threshold of temperature, the temperature of the vehicle cabin being detected by a second set of sensors. The method includes adjusting the temperature of the vehicle cabin to a first temperature. The method includes adjusting a temperature of resistive filaments of the vehicle seat of the vehicle to a second temperature. The method includes comparing a thermal image of the vehicle seat with a reference thermal image of the vehicle seat. The method further includes determining, by the comparison, if the object has been left on the vehicle seat.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
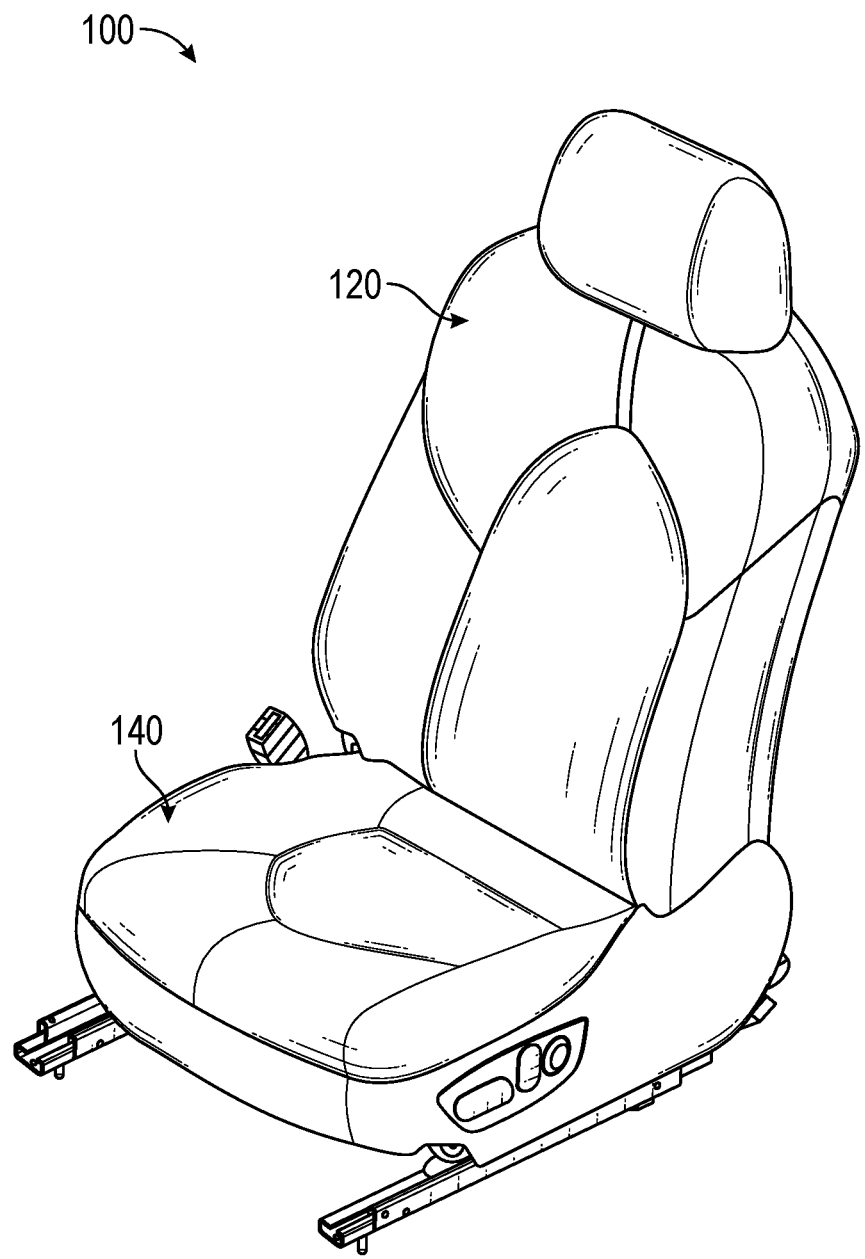
FIG. 1 is a perspective view of a seat of a vehicle according to an embodiment of the disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (e.g., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The order of discussion of the different steps as described herein has been presented for the sake of clarity. In general, these steps may be performed in any suitable order. Additionally, although each of the different features, techniques, configurations, etc. herein may be discussed in different places of this disclosure, it is intended that each of the concepts may be executed independently of each other or in combination with each other. Accordingly, the present invention may be embodied and viewed in many different ways.

FIG. 1 is a perspective view of a seat 100 of a vehicle. The seat 100 of the vehicle includes a seat cushion 140 and a seat back 120. In an embodiment of the present disclosure, the seat 100 is the seat of a driver of a motor vehicle. In another embodiment, and in a non-limiting manner, the seat 100 is a passenger seat of a motor vehicle. In a further embodiment, and in a non-limiting manner, the seat is of a motor- or non-motor vehicle, including scooters, motorcycles, and bicycles. A heating element may be present at an apical surface of the seat cushion and seat back. Filaments are interwoven into the upholstery of the seat 100. Unless otherwise specified, materials and manufacturing processes are non-limiting and include those available to one of ordinary skill in the art.

Figure 2A:
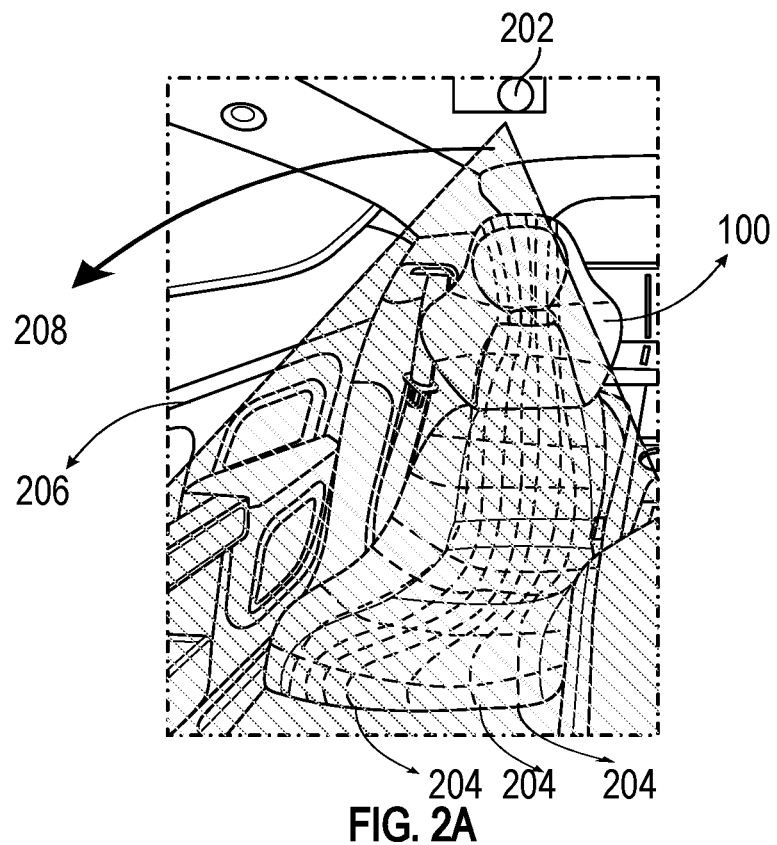
FIG. 2A is a schematic view of filaments interwoven into the upholstery of a vehicle seat according to an embodiment of the disclosure.

FIG. 2A is a schematic view of filaments interwoven into the upholstery of a vehicle seat 100. A thermal camera 202 is located on top of the vehicle seat 100. The filaments 204 have a resistance and are interwoven in, but not limited to, a particular pattern or grid-like structure. The filaments 204 are connected in parallel to a DC power source and may be heated up slightly, e.g., 10° C., over the DC power source. The heat may be generated from the filaments 204 to adjust the temperature of the vehicle seat 100. The thermal imaging field 208 may be able to capture thermal images of the vehicle seat 100 and vehicle door 206.

Figure 2B:
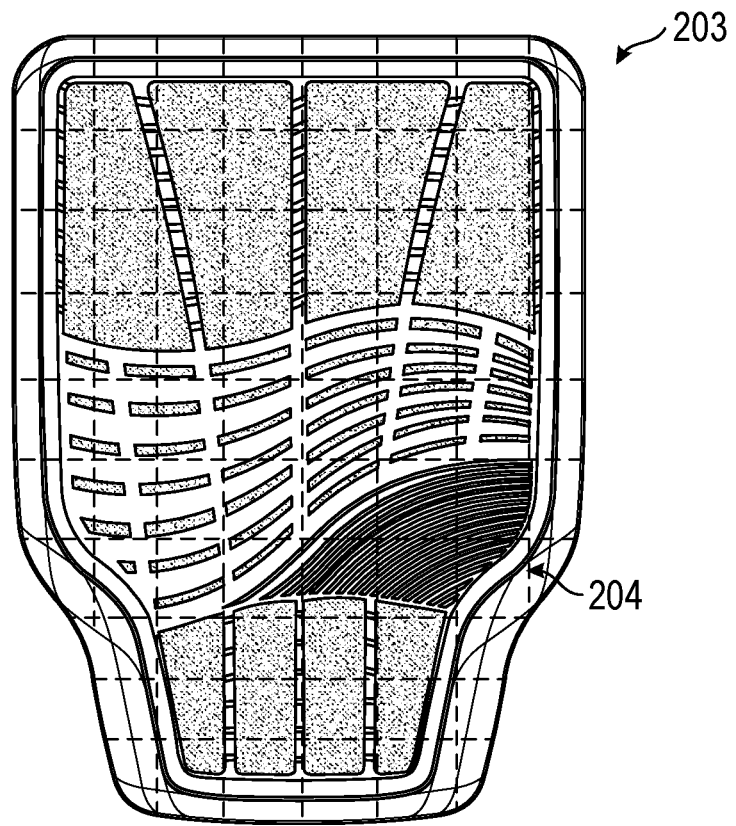
FIG. 2B is a schematic view of filaments interwoven into a floor mat according to an embodiment of the disclosure.

FIG. 2B is a schematic view of filaments 204 interwoven into a floor mat 203. Similar to the filaments 204 interwoven into the upholstery of a vehicle seat 100. The filaments 204 interwoven into the floor mat 203 have a resistance and are interwoven in, but not limited to, a particular pattern or grid-like structure. The filaments 204 are also connected in parallel to a DC power source and may be heated up slightly, e.g., 10° C., over the DC power source. The heat may be generated from the filaments 204 to adjust the temperature of the floor mat 203.

Figure 2C:
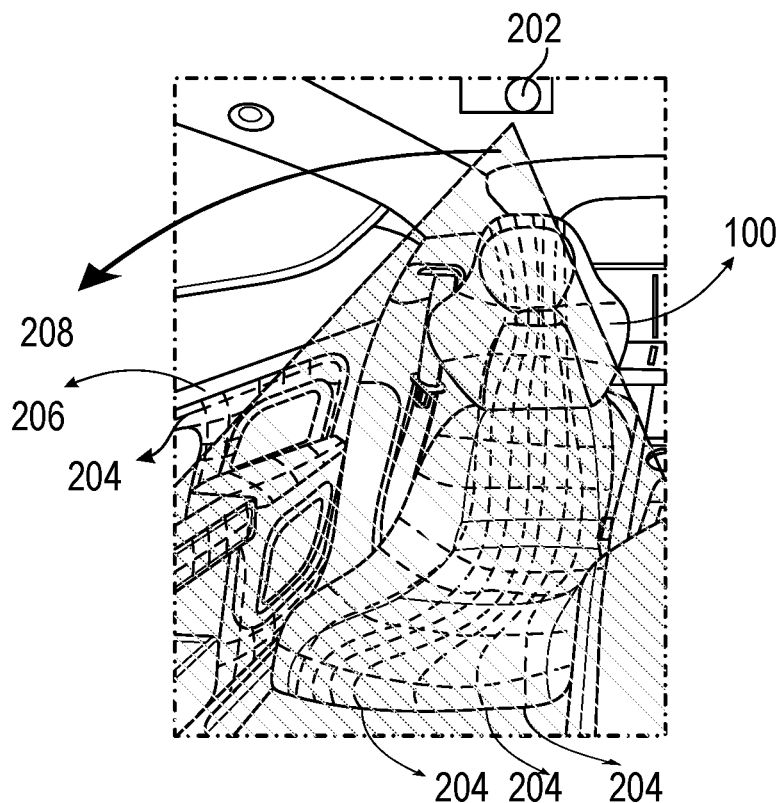
FIG. 2C is a schematic view of filaments interwoven into door frames according to an embodiment of the disclosure.

FIG. 2C is a schematic view of filaments 204 interwoven into door frames of the vehicle door 206. Similar to the filaments 204 interwoven into the upholstery of a vehicle seat. The filaments 204 interwoven into the door frames of the vehicle door 206 have a resistance and are interwoven in, but not limited to, a particular pattern or grid-like structure. The filaments 204 are also connected in parallel to a DC power source and may be heated up slightly, e.g., 10° C., over the DC power source. The heat may be generated from the filaments 2040 to adjust the temperature of the door frames.

In an embodiment, a ground truth for the vehicle seat is established before each trip in the vehicle. The ground truth is established by taking recordings of the vehicle seat using one or more thermal cameras as shown in FIGS. 2A-2C. By having filaments 204 interwoven into the vehicle seat 100, floor mat 203, or door frames of vehicle door 206, in a unique manner, the thermal cameras may be able to detect changes in the ground truth of the vehicle seat by seeing discontinuities in the seat's filament grid. If a change is detected, e.g., an object 212 is detected, the passenger who just left the vehicle 100 may be notified of leaving an object 212 behind. The vehicle 100 may then either wait for the passenger to return to the vehicle to retrieve their object or drive to a service center and drop off the vehicle at the service center for the passenger to pick the object up later. If the object 212 is determined to be trash, the passenger may be charged a fee for cleanup, and the service center may dispose the trash.

Figure 2D:
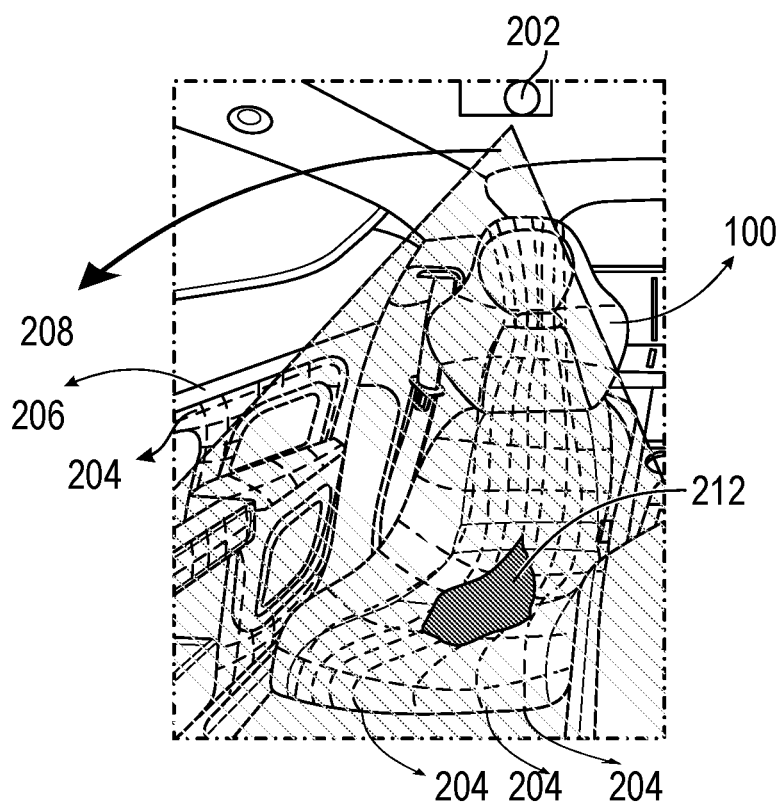
FIGS. 2D-2F show that an object has been left behind on the vehicle seat, the floor mat, or the door frames according to an embodiment of the disclosure.
Figure 2E:
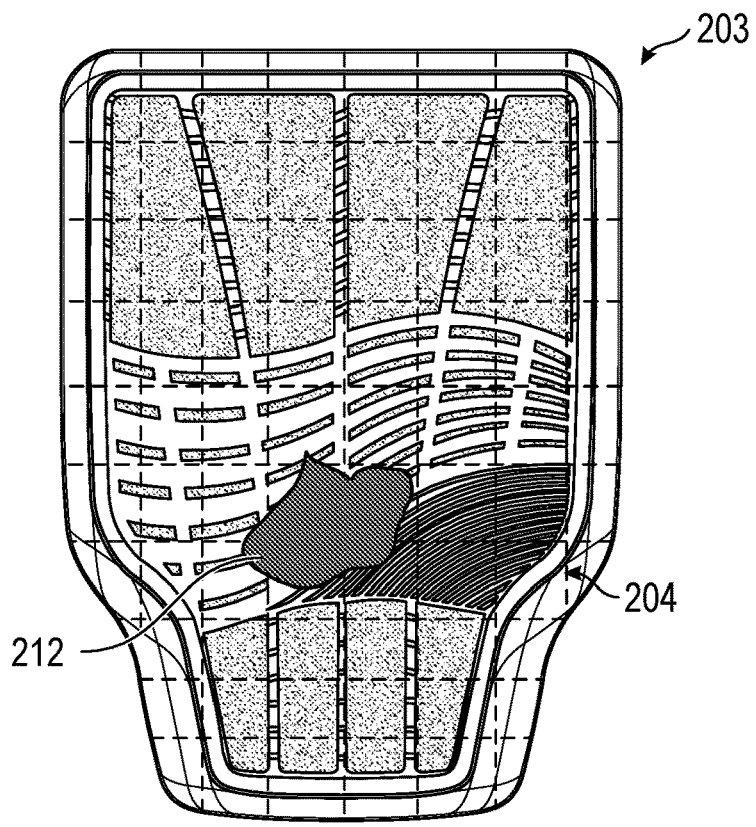
Figure 2F:
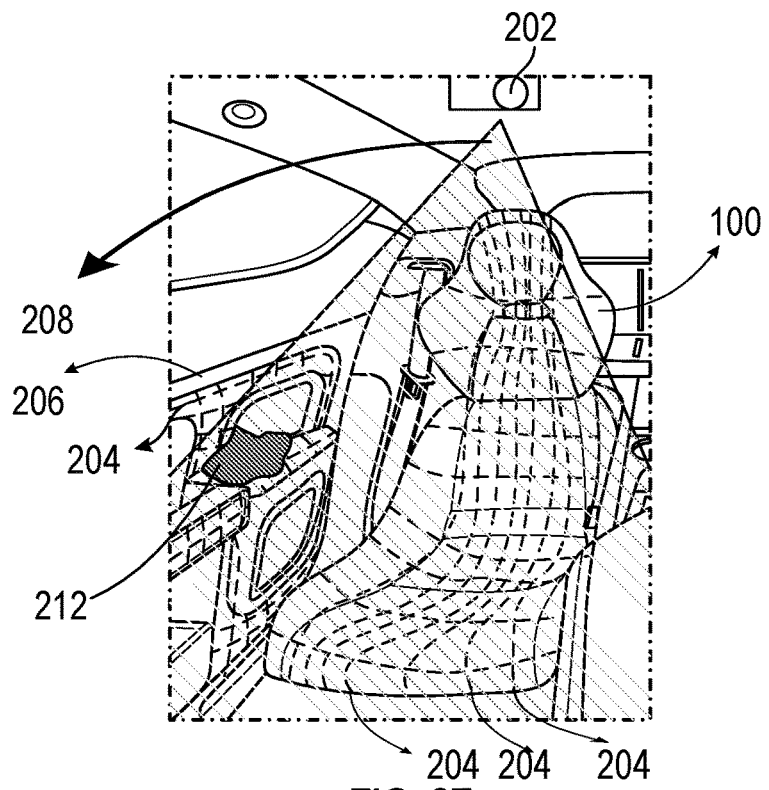

FIGS. 2D-2F show that an object 212 has been left behind on the vehicle seat 100, the floor mat 203, or the door frames of the vehicle door 206. The object 212 may be made of any materials and formed in any shape. Same as above, if a change is detected, e.g., an object is detected, the passenger who just left the vehicle may be notified of leaving an object behind. If the object 212 is determined to be trash, the passenger may be charged a fee for cleanup, and the service center may dispose the trash. In addition, a service center or a control center may be notified of the detected change, e.g., the object 212 is detected. In some embodiments, the vehicle seat 100 may be blocked off automatically because of the detection of the object 212. In some embodiments, the vehicle may return to the service center to be serviced when the object 212 is detected.

Figure 3:
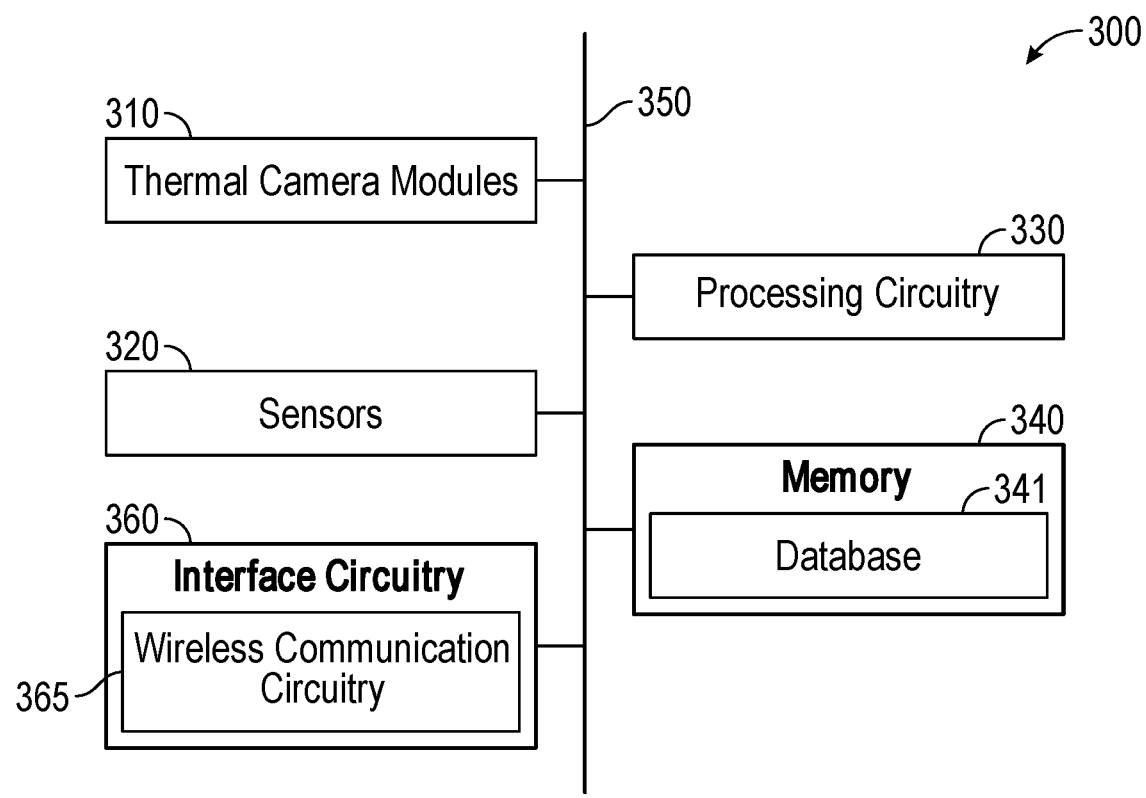
FIG. 3 is an exemplary system according to an embodiment of the disclosure.

FIG. 3 is an exemplary system 300 according to an embodiment of the disclosure. The system 300 may include thermal camera modules 310, sensors 320, processing circuitry 330, memory 340, database 341, and interface circuitry 360 that are coupled together, for example, using a bus 350. In an example, such as shown in FIG. 3, the system 300 is a part of a vehicle which has the seat as described in FIGS. 1, 2A, 2C, 2D, and 2F. The vehicle may be any suitable vehicle that may move, such as a car, a cart, a train, or the like. The vehicle may be an autonomous vehicle. Alternatively, certain components, e.g., the thermal camera modules 310 and the sensors 320, of the system 300 may be located inside the vehicle and certain components, e.g., processing circuitry 330, of the system 300 may be located remotely in a server, a cloud, or the like that may communicate with the vehicle wirelessly.

The thermal camera modules 310 may be any suitable devices which may obtain thermal images or thermal videos. The sensors 320 may capture different views, e.g., images or videos, in the vehicle. The thermal camera modules 310 and sensors 320 may be fixed to the vehicle. The thermal camera modules 310 and the sensors 320 may be detachable, for example, the sensors 320 may be attached to, removed from, and then reattached to the vehicle. The thermal camera modules 310 and sensors 320 may be positioned at any suitable locations in the vehicle. The thermal camera modules 310 and sensors 320 may be oriented toward any suitable directions. Accordingly, the thermal camera modules 310 and sensors 320 may obtain images or videos to show different portions of the environment in the vehicle.

In some embodiments, the different portions of the environment in the vehicle may include a front portion located at the front of the vehicle, a rear portion located at the back the vehicle, a right portion located at the right of the vehicle, a left portion located at the left of the vehicle, a bottom portion located at the bottom of the vehicle, a top portion located at the top of the vehicle, and/or the like. Accordingly, a front view, a rear view, a left view, a right view, a bottom view, and a top view may show the front portion, the rear portion, the left portion, the right portion, the bottom portion, and the top portion of the environment of the vehicle, respectively. For example, the bottom view may show the floor mat, or the like. In another example, the front view may show the any objects on the front seats.

Additional views (e.g., a right-front view, a top-left view) may be obtained by adjusting an orientation of the thermal camera modules 310 and the sensors 320, by combining multiple camera views, and thus show corresponding portions of the environment in the vehicle. An orientation of the thermal camera modules 310 and the sensors 320 may be adjusted such that the thermal camera modules 310 and the sensors 320 may show different portions using different orientations.

The sensors 320 may be cameras, weight sensors, a 3D LIDAR, sonar, millimeter wave radar, ultraviolet (UV) detectors, or the combination thereof. The data collected by the sensors 320 may be images, videos, weight information, etc., or the combination thereof.

In an embodiment, the data collected by the thermal camera modules 310 and the sensors 320 may be stored in the database 341 in the memory 340. The environment in the vehicle may include temperature, or objects in the vehicles, and the like, e.g., trash on the vehicle seat.

The processing circuitry 330 may obtain the data directly or may extract the data from images, videos, or the like. In an example, the processing circuitry 330 receives images from the vehicle. The images may show a portion of environment of the vehicle.

The interface circuitry 360 may be configured to communicate with any suitable device or the user of the vehicle using any suitable devices and/or communication technologies, such as wired, wireless, fiber optic communication technologies, and any suitable combination thereof. The interface circuitry 360 may include wireless communication circuitry 365 that is configured to receive and transmit data wirelessly from servers (e.g., a dedicated server, a cloud including multiple servers), vehicles (e.g., using vehicle-to-vehicle (V2V) communication), infrastructures (e.g., using vehicle-to-infrastructure (V2I) communication), one or more third-parties (e.g., a municipality), and/or the like.

The interface circuitry 360 may include any suitable individual device or any suitable integration of multiple devices such as touch screens, keyboards, keypads, a mouse, joysticks, microphones, universal series bus (USB) interfaces, optical disk drives, display devices, audio devices, e.g., speakers, and the like. The interface circuitry may include a display device. The display device may be configured to display images/videos captured by one of the thermal camera modules 310 and sensors 320. The interface circuitry 160 may be configured to output data, such as data from the thermal camera modules 310 and sensors 320 determined by the processing circuitry 330, to the vehicle and the like.

The interface circuitry 360 may be configured to receive data, such as the data described above. The data may include or indicate current condition inside the vehicle by the respective sensors 320 such as temperature, weight information, etc.

Figure 4:
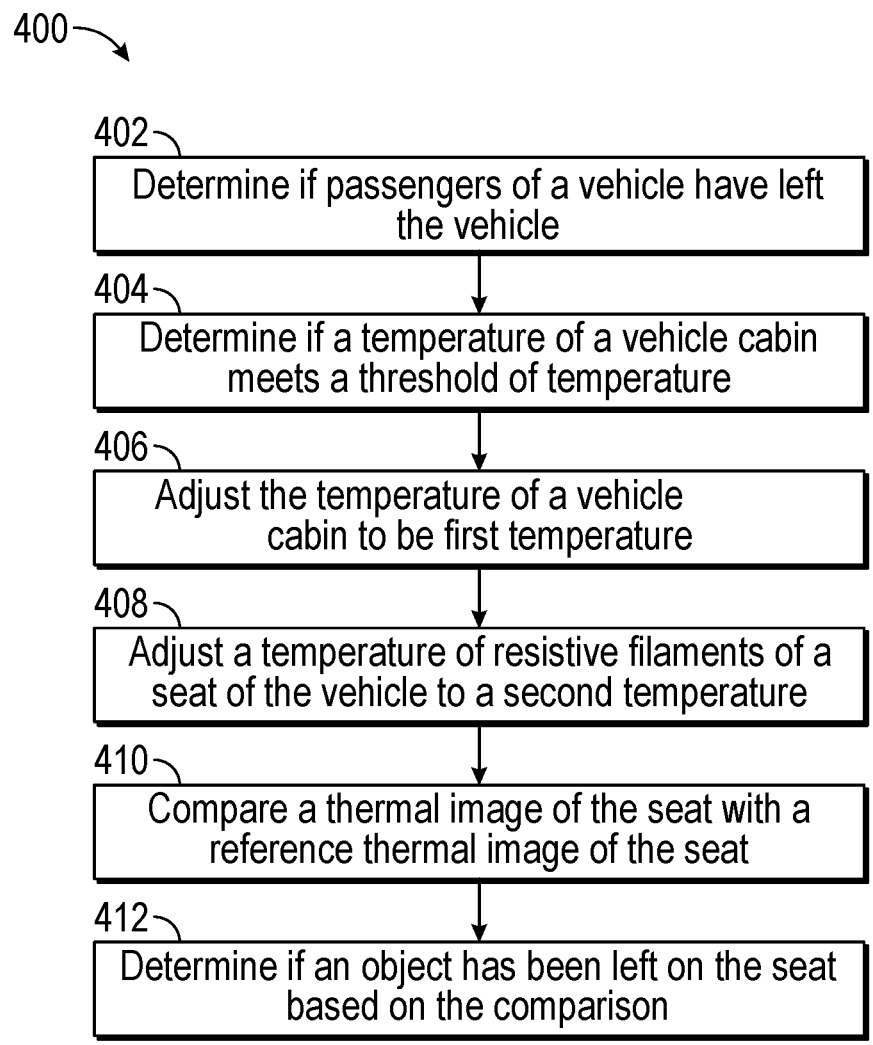
FIG. 4 is a flow chart of an exemplary process 400 for determining that an object has been left behind in a vehicle according to an embodiment of the disclosure.

FIG. 4 is a flow chart of an exemplary process 400 for determining that an object has been left behind in a vehicle according to an embodiment of the disclosure.

The method starts with step 402, determining if passengers of a vehicle have left the vehicle using sensors, e.g., cameras, weight sensors, 3D LIDAR sensors, etc.

In step 404, whether a temperature of a vehicle cabin meeting a threshold of temperature is determined. The temperature of the vehicle cabin may be between 10 degrees Celsius and 30 degrees Celsius.

In step 406, the temperature of a vehicle cabin is adjusted to a first temperature. The first temperature may be 15 degrees Celsius. For example, the vehicle's heating, ventilation, and air conditioning (HVAC) system is turned on to achieve a uniform, low ambient temperature within the vehicle cabin. In some embodiments, if the vehicle's seats have ventilation capabilities, these vents may also be turned on to help achieve the uniform, low ambient temperature. Temperature sensors may be located within the vehicle to measure the ambient temperature.

In step 408, a temperature of resistive filaments of a seat of the vehicle is adjusted to a second temperature. The second temperature may be 45 degrees Celsius. Lookup tables for different ground truths corresponding to different temperatures may be used for referencing what the seat's filament patterns should be at a measured ambient temperature. The lookup table may include reference thermal images of the vehicle seats, floor mat, or door frames, associated with the first temperature and the second temperature. The reference thermal images may also dependent on the current humidity or current weather condition.

In step 410, a thermal image of the seat is compared with a reference thermal image of the seat. For example, the filaments within the vehicle seats may be turned on to create a temperature difference (e.g., delta temperature) between the resistive filaments and ambient temperature to make the enhanced grid pattern distinct for the thermal cameras, e.g., IR or near-IR sensors. For a finer pattern, the delta temperatures may be increased using the heating or cooling features of the seat to provide a crisp grid-like backdrop to illuminate the seat. The detected grid (or other pattern) may be reconfigured according to the known camera angle and curvature of pattern as captured from the camera's field of view.

In step 412, an object is determined if it has been left on the vehicle seat based on the comparison in the step 410. For example, if the thermal image of the seat is different from the reference thermal image of the seat, then the object, e.g., trash, water bottle, etc., must have been left on the vehicle seat.

In some embodiments, in such reconfigured patterns, rather than interweaving the filaments, the present disclosure may employ photo luminescent or thermal activated dyes applied to the fabric. Based on the absences of filament patterns in particular areas of the seat, the vehicle may detect left-behind objects. For example, instead of using heated filaments, the seats' upholsteries may be integrated with IR paint along the seats' trims or detailing. This may allow for IR sensors within the vehicle to sense a difference in emissivity if an object or spill is present.

In some embodiments, the difference in emissivity sensed by the IR sensors mentioned earlier may not be limited to the object or the spill. The difference in emissivity may also be caused by a contamination of a surface from fluids or fluid-like substances, e.g., gum, melted lip balm, milkshake, or the like.

In one embodiment, the system described may be used to detect the presence of a human or animal. A thermal camera may sense a temperature corresponding to that of a human or animal as compared to an inanimate object. Based on the detection of a human, the vehicle may tailor vehicle settings to that of a human such as an airbag being on and ready to deploy.

Different vehicles may have different data available in the respective vehicles. The process 400 may be adapted by different vehicle type, different vehicle condition. The process 400 may be suitably modified. Steps may be added, omitted, and/or combined. An order of implementing steps in the process 400 may be adapted. In an example, the order of the steps 406 and 408 may be switched.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting.

Those skilled in the art will also understand that there may be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Embodiments of the present disclosure may also be as set forth in the following parentheticals.

(1) A method of determining an object has been on a vehicle seat of a vehicle, comprising: determining, by processing circuitry, if passengers of the vehicle have left the vehicle, the passengers of the vehicle having left the vehicle being detected by a first set of sensors; determining, by the processing circuitry, if a temperature of a vehicle cabin of the vehicle meets a threshold of temperature, the temperature of the vehicle cabin being detected by a second set of sensors; adjusting the temperature of the vehicle cabin to a first temperature; adjusting a temperature of resistive filaments of the vehicle seat of the vehicle to a second temperature; comparing a thermal image of the vehicle seat with a reference thermal image of the vehicle seat; and determining, by the comparison, if the object has been left on the vehicle seat.

(2) The method of (1), wherein the passengers of the vehicle having left the vehicle is determined after the vehicle stops operating.

(3) The method of any (1) to (2), wherein the first set of sensors include at least one of cameras, weight sensors, and motion sensors.

(4) The method of any (1) to (3), wherein the second set of sensors include at least one of infrared sensors and temperature sensors.

(5) The method of any (1) to (4), wherein the threshold of the temperature is between 10 degrees Celsius and 30 degrees Celsius.

(6) The method of any (1) to (5), wherein the thermal image is captured by the second set of sensors.

(7) The method of any (1) to (6), wherein the determination if the object has been left on the vehicle seat is transmitted to at least one of a database in the vehicle, a database in a vehicle manufacturer, and a database in a vehicle service center.

(8) The method of any (1) to (7), wherein the reference thermal image is dependent on the first temperature and the second temperature.

(9) The method of any (1) to (8), wherein the determination that the object has been left on the vehicle seat is based on a difference of the thermal image and the reference thermal image.

(10) A system for determining an object has been on a vehicle seat of a vehicle, comprising a database server including processing circuitry configured to determine, by the processing circuitry, if passengers of the vehicle have left the vehicle, the passengers of the vehicle having left the vehicle being detected by a first set of sensors; determine, by the processing circuitry, if a temperature of a vehicle cabin of the vehicle meets a threshold of temperature, the temperature of the vehicle cabin being detected by a second set of sensors; adjust the temperature of the vehicle cabin to a first temperature; adjust a temperature of resistive filaments of the vehicle seat of the vehicle to a second temperature; compare a thermal image of the vehicle seat with a reference thermal image of the vehicle seat; and determine, by the comparison, if the object has been left on the vehicle seat.

(11) The system of (10), wherein the passengers of the vehicle having left the vehicle is determined after the vehicle stops operating.

(12) The system of any (10) to (11), wherein the first set of sensors include at least one of cameras, weight sensors, and motion sensors.

(13) The system of any (10) to (12), wherein the second set of sensors include at least one of infrared sensors and temperature sensors.

(14) The system of any (10) to (13), wherein the threshold of the temperature is between 10 degrees Celsius and 30 degrees Celsius.

(15) The system of any (10) to (14), wherein the thermal image is captured by the second set of sensors and the determination if the object has been left on the vehicle seat is transmitted to at least one of a database in the vehicle, a database in a vehicle manufacturer, and a database in a vehicle service center.

(16) The system of any (10) to (15), wherein the reference thermal image is dependent on the first temperature and the second temperature.

(17) The system of any (10) to (16), wherein the determination that the object has been left on the vehicle seat is based on a difference of the thermal image and the reference thermal image.

(18) The system of any (10) to (17), wherein the resistive filaments are further integrated with luminescent dyes, thermal activated dyes, or infrared paint.

(19) A non-transitory computer readable storage medium having instructions stored thereon that when executed by processing circuitry causes the processing circuitry to perform a method, the method comprising determining, by the processing circuitry, if passengers of the vehicle have left the vehicle, the passengers of the vehicle having left the vehicle being detected by a first set of sensors; determining, by the processing circuitry, if a temperature of a vehicle cabin of the vehicle meets a threshold of temperature, the temperature of the vehicle cabin being detected by a second set of sensors; adjusting the temperature of the vehicle cabin to a first temperature; adjusting a temperature of resistive filaments of the vehicle seat of the vehicle to a second temperature; comparing a thermal image of the vehicle seat with a reference thermal image of the vehicle seat; and determining, by the comparison, if the object has been left on the vehicle seat.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A method of determining an object has been left on a vehicle seat of a vehicle, comprising:
    determining, by processing circuitry, if passengers of the vehicle have left the vehicle, the passengers of the vehicle having left the vehicle being monitored by a first set of sensors;
    determining, by the processing circuitry, if a temperature of a vehicle cabin of the vehicle meets a threshold of temperature, the temperature of the vehicle cabin being monitored by a second set of sensors;
    adjusting the temperature of the vehicle cabin to a first temperature;
    adjusting a temperature of resistive filaments of the vehicle seat of the vehicle to a second temperature;
    obtaining a thermal image of the vehicle seat;
    comparing the thermal image with a reference thermal image of the vehicle seat, the reference thermal image including a reference arrangement of the resistive filaments; and
    determining, by the comparison of the thermal image with the reference thermal image including the reference arrangement of the resistive filaments, if the object has been left on the vehicle seat.

2. The method of claim 1, wherein the passengers of the vehicle having left the vehicle is determined before the vehicle starts.

3. The method of claim 1, wherein
    the first set of sensors include at least one of cameras, motion sensors, and weight sensors, and
    the second set of sensors include at least one of infrared sensors and temperature sensors.

4. The method of claim 1, wherein
    the reference arrangement includes a reference pattern, and
    the determining if the object has been left on the vehicle seat including determining, by the comparison of the thermal image with the reference thermal image including the reference pattern of the resistive filaments, if the object has been left on the vehicle seat.

5. The method of claim 1, wherein the threshold of the temperature is between 10 degrees Celsius and 30 degrees Celsius.

6. The method of claim 1, wherein the thermal image is captured by the second set of sensors.

7. The method of claim 1, wherein the determination if the object has been left on the vehicle seat is transmitted to at least one of a database in the vehicle, a database in a vehicle manufacturer, and a database in a vehicle service center.

8. The method of claim 1, wherein the reference thermal image is dependent on the first temperature and the second temperature.

9. The method of claim 1, wherein the determination that the object has been left on the vehicle seat is based on a difference of the thermal image and the reference thermal image.

10. The method of claim 1, wherein the resistive filaments are further integrated with luminescent dyes, thermal activated dyes, or infrared paint.

11. A system for determining an object has been left on a vehicle seat of a vehicle, comprising:
    a database server including processing circuitry configured to:
    determine, by the processing circuitry, if passengers of the vehicle have left the vehicle, the passengers of the vehicle having left the vehicle being detected by a first set of sensors;
    determine, by the processing circuitry, if a temperature of a vehicle cabin of the vehicle meets a threshold of temperature, the temperature of the vehicle cabin being detected by a second set of sensors;
    adjust the temperature of the vehicle cabin to a first temperature;
    adjust a temperature of resistive filaments of the vehicle seat of the vehicle to a second temperature;
    obtain a thermal image of the vehicle seat;
    compare the thermal image with a reference thermal image of the vehicle seat, the reference thermal image including a reference arrangement of the resistive filaments; and
    determine, by the comparison of the thermal image with the reference thermal image including the reference arrangement of the resistive filaments, if the object has been left on the vehicle seat.

12. The system of claim 11, wherein the passengers of the vehicle having left the vehicle is determined before the vehicle starts.

13. The system of claim 11, wherein
    the first set of sensors include at least one of cameras, motion sensors, and weight sensors, and
    the second set of sensors include at least one of infrared sensors and temperature sensors.

14. The system of claim 11, wherein
    the reference arrangement includes a reference pattern, and
    the processing circuitry is configured to determine, by the comparison of the thermal image with the reference thermal image including the reference pattern of the resistive filaments, if the object has been left on the vehicle seat.

15. The system of claim 11, wherein the thermal image is captured by the second set of sensors.

16. The system of claim 11, wherein the determination if the object has been left on the vehicle seat is transmitted to at least one of a database in the vehicle, a database in a vehicle manufacturer, and a database in a vehicle service center.

17. The system of claim 11, wherein the reference thermal image is dependent on the first temperature and the second temperature.

18. The system of claim 11, wherein the determination that the object has been left on the vehicle seat is based on a difference of the thermal image and the reference thermal image.

19. The system of claim 11, wherein the resistive filaments are further integrated with luminescent dyes, thermal activated dyes, or infrared paint.

20. A non-transitory computer readable storage medium having instructions stored thereon that when executed by processing circuitry causes the processing circuitry to perform a method, the method comprising:

determining, by the processing circuitry, if passengers of a vehicle have left the vehicle, the passengers of the vehicle having left the vehicle being detected by a first set of sensors;

determining, by the processing circuitry, if a temperature of a vehicle cabin of the vehicle meets a threshold of temperature, the temperature of the vehicle cabin being detected by a second set of sensors;

adjusting the temperature of the vehicle cabin to a first temperature;

adjusting a temperature of resistive filaments of a vehicle seat of the vehicle to a second temperature;

obtaining a thermal image of the vehicle seat;

comparing the thermal image with a reference thermal image of the vehicle seat, the reference thermal image including a reference arrangement of the resistive filaments; and determining, by the comparison of the thermal image with the reference thermal image including the reference arrangement of the resistive filaments, if an object has been left on the vehicle seat.

\* \* \* \* \*